United States Patent
Wissing et al.

[11] Patent Number: 6,064,446
[45] Date of Patent: May 16, 2000

[54] COLOR DECODING

[75] Inventors: Roy W.B. Wissing, Eindhoven; Roy P.M. Van Lammeren, Nijmegen; Marcellinus J.M. Pelgrom, Eindhoven, all of Netherlands

[73] Assignee: U.S. Philips Corporation, New York, N.Y.

[21] Appl. No.: 09/022,451

[22] Filed: Feb. 12, 1998

[30] Foreign Application Priority Data

Sep. 4, 1997 [EP] European Pat. Off. .............. 97201029

[51] Int. Cl.$^7$ ...................................................... H04N 9/66
[52] U.S. Cl. ........................ 348/639; 348/508; 348/641
[58] Field of Search .................................. 348/638, 641, 348/508, 507, 727; 329/316, 336, 327

[56] References Cited

U.S. PATENT DOCUMENTS

| | | | |
|---|---|---|---|
| 4,349,833 | 9/1982 | Clarke | 348/639 |
| 4,605,953 | 8/1986 | Wilkinson et al. | 348/64 D |
| 4,689,664 | 8/1987 | Möring et al. | 348/639 |
| 4,694,327 | 9/1987 | Demmer et al. | 348/508 |
| 4,710,802 | 12/1987 | Warmuth et al. | 348/639 |
| 4,736,237 | 4/1988 | Fling et al. | 348/508 |
| 4,745,463 | 5/1988 | Lu | 348/638 |
| 5,359,368 | 10/1994 | Srivastava | 348/641 |
| 5,396,294 | 3/1995 | Fujii et al. | 348/508 |
| 5,459,524 | 10/1995 | Cooper | 348/507 |
| 5,621,478 | 4/1997 | Demmer | 348/639 |
| 5,703,660 | 12/1997 | Hawkinson et al. | 348/638 |
| 5,796,786 | 8/1998 | Lee | 375/326 |

FOREIGN PATENT DOCUMENTS 9112696  8/1991  WIPO .

*Primary Examiner*—Victor R. Kostak
*Attorney, Agent, or Firm*—Edward W. Goodman

[57] ABSTRACT

In a method of demodulating an analog chrominance signal (C), digital quadrature signals are generated (DPA, SIN ROM, COS ROM) for demodulating (MUL DAC U, MUL DAC V) the analog chrominance signal (C) to obtain analog demodulated color difference signals (U, V). A digital phase error signal is furnished (ΣΔmod) from at least one (V) of the analog demodulated color difference signals (U, V). The digital phase error signal is digitally filtered (DLF) to obtain a phase control signal (K) for the digital quadrature signals generation (DPA, SIN ROM, COS ROM).

7 Claims, 3 Drawing Sheets

COLOR DECODING

BACKGROUND OF THE INVENTION

1. Field of the Invention

The invention relates to a method and a device for color decoding, and to a television signal display apparatus (TV set, PC having TV signal processing functions, etc.) comprising such a color decoding device.

2. Description of the Related Art

Until now, multi-standard (PAL/NTSC) color decoding, without digitizing the chrominance signal, has mainly been done using an analog phase-locked loop, in which a voltage-controlled crystal oscillator (VCXO) is locked to the color burst signal, see J. van Lammeren et al., Multi-Standard Video Front End, IEEE Transactions on Consumer Electronics, Vol. 37, No. 3, August 1991, pp. 190–196. A simplified diagram of a prior art analog color decoder is given in FIG. 1. The voltage controlled crystal oscillator VCXO regenerates sine and cosine versions of the color subcarrier, both with the correct phase. The subcarrier signals are fed to analog multipliers, where they are multiplied with the chrominance signal. By these multiplications, the chroma quadrature components U and V are separated and demodulated. The main disadvantage of this type of color decoder is that for each variant of the PAL/NTSC standards, a different external crystal is necessary. Therefore a conventional multi-standard color decoder IC has to be equipped with several external crystals which can be tuned satisfactorily, and thus with several additional IC pins.

In Murayama et al., Single-Chip BICMOS Multistandard Video Processor, IEEE Transactions on Consumer Electronics, Vol. 42, No. 3, August 1996, pp. 739–749, a color decoder is described that uses only one external crystal for decoding all variants of the PAL/NTSC standards. However, that system has some disadvantages:

The external crystal that is used in this system must still be a crystal which can be tuned satisfactorily. Tunable crystals are much more expensive than standard crystals, which are poorly tunable.

As the crystal oscillator (VCXO) in this system is locked to the incoming color burst, it can not be used, at the same time, as an asynchronous clock generator for other on-chip applications, e.g., teletext decoding or A/D and D/A conversion.

The system contains an analog PLL that acts as a bandpass filter for the digitally generated subcarrier. The performance of the VCO in this PLL completely determines the overall quality of the color decoder. The required specifications for this VCO can only be achieved when using a well-characterized process (e.g., BiCMOS) and will be degraded by the presence of digital circuitry on the chip, which causes substrate noise. As there is a trend towards CMOS processes and more and more digital functionality, this color decoder is not fully 'future proof'.

The automatic phase control (APC) loop still requires an external loop filter, which necessitates an extra IC pin.

SUMMARY OF THE INVENTION

It is, inter alia, an object of the invention to provide better multi-standard color decoding. To this end, a first aspect of the invention provides a method of demodulating an analog chrominance signal, the method comprising the steps of generating digital quadrature signals; demodulating said analog chrominance signal by means of said digital quadrature signals to obtain analog demodulated color difference signals; furnishing a digital phase error signal from at least one of said analog demodulated color difference signals; and digitally filtering said digital phase error signal to obtain a phase control signal for said digital quadrature signals generating step. A second aspect of the invention provides a quadrature signal demodulator for demodulating an analog quadrature modulated signal, the demodulator comprising means for generating digital quadrature signals; means for demodulating said analog quadrature modulated signal by means of said digital quadrature signals to obtain analog demodulated signals; means for furnishing a digital phase error signal from at least one of said analog demodulated signals; and means for digitally filtering said digital phase error signal to obtain a phase control signal for said digital quadrature signals generating means. A third aspect of the invention provides a television signal display apparatus (TV set, PC having TV signal processing functions, etc.) comprising such a demodulator as a color decoding device.

In a method of demodulating an analog chrominance signal in accordance with a primary aspect of the present invention, digital quadrature signals are generated for demodulating the analog chrominance signal to obtain analog demodulated color difference signals. A digital phase error signal is furnished from at least one of the analog demodulated color difference signals. The digital phase error signal is digitally filtered to obtain a phase control signal for the digital quadrature signals generation.

BRIEF DESCRIPTION OF THE DRAWING

These and other aspects of the invention will be apparent from and elucidated with reference to the embodiments described hereinafter.

In the drawings.

DESCRIPTION OF THE PREFERRED EMBODIMENTS

Figure 1:
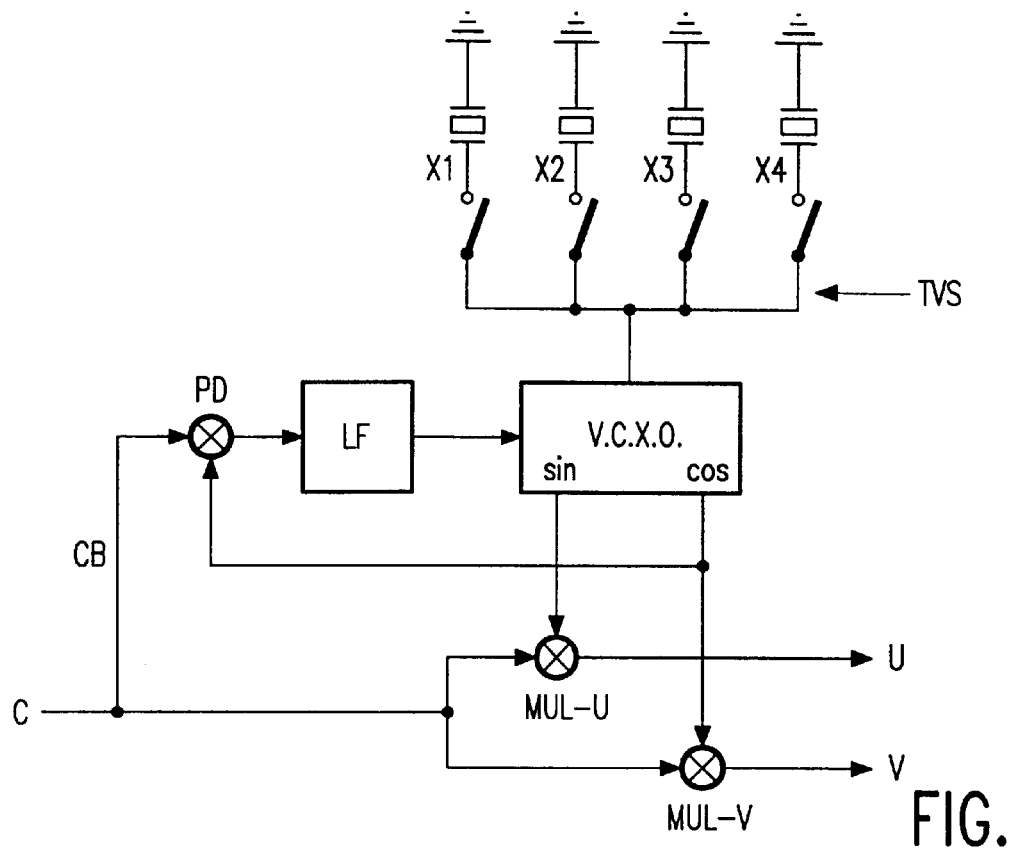
FIG. 1 shows a prior art color decoder.

A simplified diagram of a prior art analog color decoder is given in FIG. 1. The voltage controlled crystal oscillator VCXO regenerates a sin and a cos version of the color subcarrier, both with the correct phase. The subcarrier signals sin, cos are fed to analog multipliers MUL-U, MUL-V, where they are multiplied by a chrominance signal C. By these multiplications, the chroma quadrature components U and V are separated and demodulated. For each variant of the PAL/NTSC standards, a different external crystal X1, X2, X3, X4 is present. Switches, controlled by a TV, standard indicating signal TVS connect the desired crystal to the oscillator VCXO. A color burst part CB of the chrominance signal C and the cos signal from the oscillator VCXO are applied to a phase detector PD, whose output is coupled to the oscillator VCXO through a loop filter LF.

A preferred embodiment of the present invention is a multi-standard color decoder that deals with all the disadvantages mentioned above. It relates to a mixed-signal system that needs only one (external) asynchronous crystal clock to demodulate all the variants of the PAL/NTSC color system, without digitizing the analog chrominance signal. For example, the clock signal already present for TXT processing can be used. Moreover, the system needs no additional external components/IC-pins and does not contain any highly critical analog modules. The loop filter can be made inside an IC. The decoder can therefore be realized both in BiCMOS and mainstream CMOS processes and can also be easily combined with digital functionality.

Figure 2:
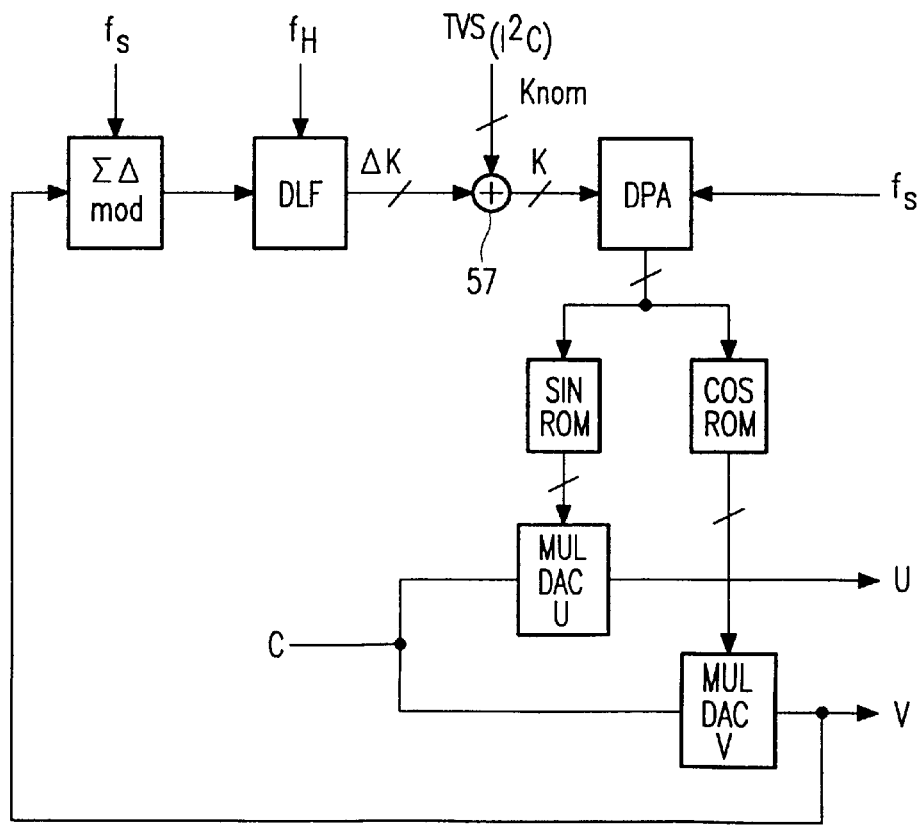
FIG. 2 shows an embodiment of a color decoder in accordance with the present invention.

A block diagram of a preferred embodiment of the invention is given in FIG. 2. The heart of the system is formed by a digital phase accumulator DPA. It is used to generate the different subcarrier frequencies from a crystal-stable reference clock fs e.g., of 27 MHz. The principle of the phase accumulator, also called Discrete Time Oscillator (DTO), Direct Digital Synthesizer (DDS), or ratio-counter, is described in Murayama et al., Single-Chip BICMOS Multistandard Video Processor, IEEE Transactions on Consumer Electronics, Vol. 42, No. 3, August 1996, pp. 739–749, and in C.P. Sandbank, Digital Television, Wiley 1990. As the phase accumulator DPA generates a digital sawtooth of the desired subcarrier frequency, it is followed by two ROM tables, SIN ROM and COS ROM, that contain sine wave and cosine wave amplitude data. In this way, the sawtooth is converted into both a sine and a cosine waveform of which the spurious components are sufficiently suppressed. Moreover, an excellent phase stability between sine and cosine is obtained. The digital subcarrier signals are multiplied by the analog chrominance signal C using two multiplying D/A converters, namely MUL DAC U and MUL DAC V. These are D/A converters of which the reference input is controlled by an analog signal C instead of being fixed to a reference source. For example, a resistor string D/A converter whose resistance ladder is controlled by a differential analog input, or a current D/A converter with binary weighted current sources controlled by a differential analog input. The analog output signals of the MUL DACs are the demodulated color difference signals U and V.

The digital subcarrier regenerator, formed by the phase accumulator DPA and the ROM look up tables SIN ROM and COS ROM, is locked to the incoming color burst by placing it in a phase-locked loop (PLL). During the burst key period, one of the MUL DACs (MUL DAC V) acts as the phase detector for this PLL. The MUL DAC V generates an analog phase error that is digitized by a simple first order 1-bit Sigma-Delta modulator ΣΔmod operating at the system clock frequency fs of 27 MHz. The Sigma-Delta modulator is a well known example of an attractive 1-bit A/D converter; alternatives are conceivable. The Sigma-Delta modulator is followed by a digital loop filter DLF that mainly operates at the TV line-frequency (fH). The digital filter DLF replaces the external loop filter of the analog color decoder and can also be easily combined with the decimation filter of the Sigma-Delta modulator. Besides, the digital loop filter DLF contains a PAL averager that eliminates the PAL H/2 burst swing. The digital output signal of the loop filter DLF is used to control the phase accumulator DPA, so that it can remain in-lock with the color burst. The output signal of the loop filter DLF forms a small offset ΔK on the nominal input word Knom of the phase accumulator DPA. The nominal input word Knom is preset via the I2$_c$ bus and is determined by the color TV standard TVS to be received.

The preferred embodiment of FIG. 2 shows the following advantages. Instead of four tunable external crystals, an asynchronous crystal-stable system clock is used. The chrominance signal path remains analog. Instead of an external loop filter, an integratable digital loop filter is used. Highly critical analog components are avoided. Unlike the Murayama circuit having an analog PLL to adjust the clock frequency while the phase control signal K applied to the digital phase accumulator DPA is fixed, the preferred embodiment of the present invention features a digital PLL of which the phase control signal K is adjusted while the clock frequency is fixed so that, for example, the TXT clock can be used.

Figure 3:
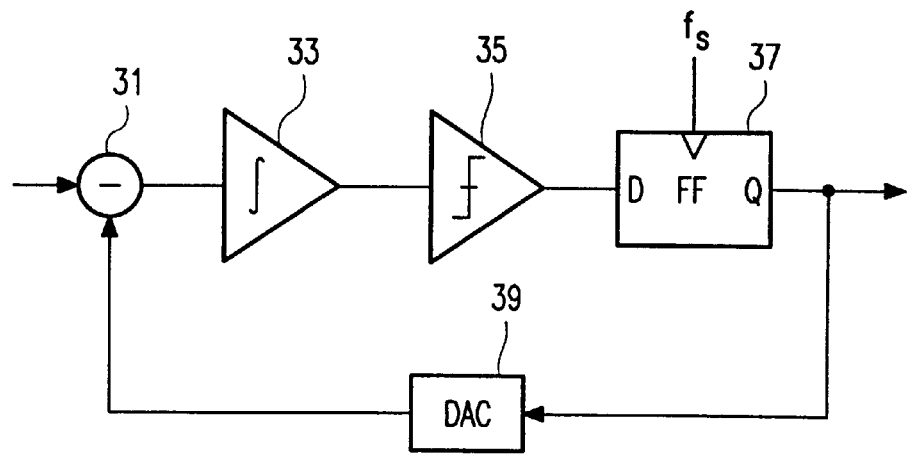
FIG. 3 shows an embodiment of a Sigma-Delta modulator for use in the embodiment of FIG. 2.

FIG. 3 shows an embodiment of a Sigma-Delta modulator for use in the color decoder of FIG. 2. The analog signal from the MUL DAC V of FIG. 2 is applied to a first input of a subtracter 31, whose output is connected to a cascade connection of an integrator 33, a comparator 35, and a D flip-flop 37 to obtain an output bitstream as a result of the 1-bit Sigma-Delta modulation. The output bitstream is applied to a second input of the subtracter 31 through a 1-bit D/A convertor 39, which may be formed by a switched current source. The integrator 33, the comparator 35, and the D flip-flop 37 together perform a pulse-density modulation and a noise-shaping function. The used Sigma-Delta modulator for digitizing the phase error has the following advantages. A dynamic range of 60 dB can easily be achieved in the frequency band of interest (0–7.8 kHz=0.5 fH). It consists of very small and simple circuits compared to a conventional A/D converter. Because of the high sampling frequency of 27 MHz, no analog pre-filter is required (filtering would cause response problems). Digital post-filtering can easily be combined with a loop filter.

Figure 4:
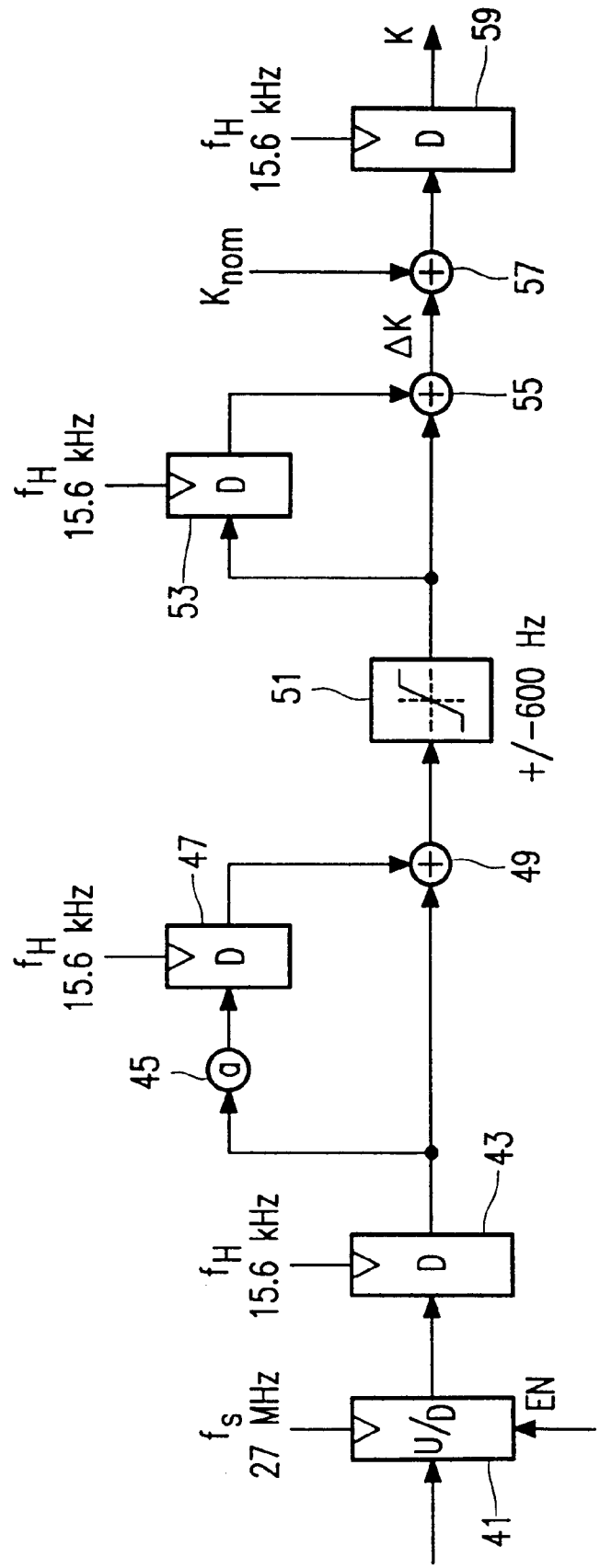
FIG. 4 shows an embodiment of a digital loop filter for use in the embodiment of FIG. 2.

FIG. 4 shows an embodiment of a digital loop filter DLF for use in the color decoder of FIG. 2. The bitstream supplied by the Sigma-Delta modulator of FIG. 3 is applied to an up/down counter 41 which is enabled by a burst gate signal and clocked by the high-frequency system clock, and which acts as a decimation filter and as an integrator of the PLL loop filter. The output of the counter is applied to a decimating D flip-flop 43 clocked by a line frequency signal fHi for providing a digitized and integrated phase error. The remainder of the loop filter of FIG. 4 takes care of the loop stability, gives the PLL desired parameters as to damping and natural frequency, provides a sufficient suppression of the PAL H/2 swing (>45 dB), and limits the tuning range of the digital quadrature generator formed by the digital phase accumulator DPA and the sine and cosine ROMs to a range of ±600 Hz. The output of the D flip-flop 43 is applied to a differentiator which comprises a multiplier 45, a D flip-flop 47, and an adder 49 which adds the output of the D flip-flop 47 to the output of the D flip-flop 43. The output of the adder 49 is applied to a frequency range limiter 51. An output of the frequency range limiter 51 is applied to an averager which comprises a D flip-flop 53, and an adder 55 which adds the output of the D flipfiop 53 to the output of the frequency range limiter 51. The output of the adder 55 supplies the offset ΔK referred to with reference to FIG. 2. An adder 57, also shown in FIG. 2, adds this offset ΔK to the nominal value K which is determined by the TV standard. An output of the adder 57 is applied to a D flip-flop 59 which furnishes the phase control signal K for the digital phase accumulator DPA of FIG. 2.

Figure 5:
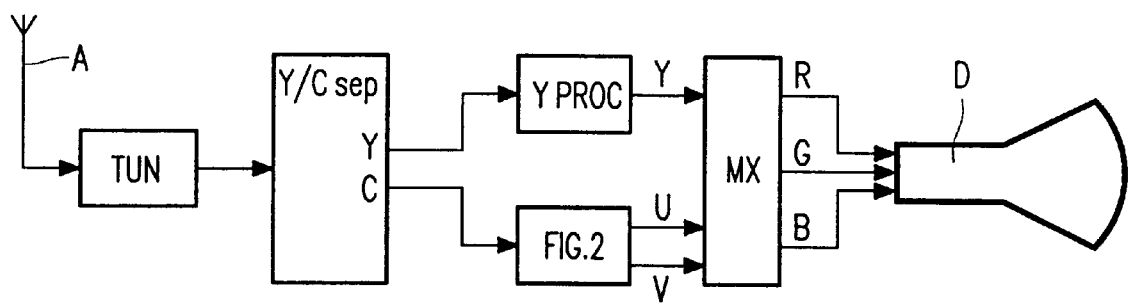
FIG. 5 shows an embodiment of a television display apparatus comprising the color decoder of FIG. 2.

FIG. 5 shows an embodiment of a television display apparatus comprising the color decoder of FIG. 2. A television signal is received by an antenna A and applied to a tuner TUN which carries out HF and IF demodulation functions to furnish a baseband video signal to a Y/C separator Y/C sep. The Y/C separator supplies a luminance signal Y to a luminance processor Y proc for carrying out functions such as sharpness improvement, etc. The separator supplies a chrominance signal C to the color decoder of FIG. 2 to obtain demodulated U and V signals. A matrix circuit MX converts the Y, U and V signals into R, G, and B color signals which are displayed on a display device D.

It should be noted that the above-mentioned embodiments illustrate rather than limit the invention, and that those sldlled in the art will be able to design many alternative embodiments without departing from the scope of the appended claims. The invention can be implemented by means of hardware comprising several distinct elements, and by means of a suitably programmed computer.

What is claimed is:

1. A method of demodulating an analog chrominance signal, the method comprising the steps:

generating digital quadrature signals;

demodulating said analog chrominance signal using said digital quadrature signals to form analog demodulated color difference signals;

determining a digital phase error signal from at least one of said analog demodulated color difference signals; and digitally filtering said digital phase error signal to form a phase control signal for said step of generating digital quadrature signals.

2. A method as claimed in claim 1, wherein said step of generating digital quadrature signals comprises the steps:

accumulating said phase control signal to form address signals; and addressing look-up tables using said address signals to form said digital quadrature signals.

3. A method as claimed in claim 1, wherein said step of demodulating said analog chrominance signal includes applying said analog chrominance signal to reference inputs of multiplying D/A converters having digital inputs coupled to receive said digital quadrature signals.

4. A method as claimed in claim 1, wherein said step of determining a digital phase error signal includes performing a 1-bit Sigma-Delta modulation of one of said analog demodulated color difference signals.

5. A method as claimed in claim 1, wherein a fixed high frequency system clock is used in said step of generating digital quadrature signals.

6. A device for demodulating an analog quadrature modulated signal, the device comprising:

means for generating digital quadrature signals;

means for demodulating said analog quadrature modulated signal using said digital quadrature signals to form analog demodulated signals;

means for determining a digital phase error signal from at least one of said analog demodulated signals; and means for digitally filtering said digital phase error signal to form a phase control signal for said digital quadrature signals generating means.

7. A television signal display apparatus, comprising:

means for generating a luminance signal and an analog chrominance signal;

a device for demodulating said analog chrominance signal to form analog demodulated color difference signals, the device comprising:

means for generating digital quadrature signals;

means for demodulating said analog chrominance signal using said digital quadrature signals to form said analog demodulated color difference signals;

means for determining a digital phase error signal from at least one of said analog demodulated color difference signals; and means for digitally filtering said digital phase error signal to form a phase control signal for said digital quadrature signals generating means;

means generating color signals from said luminance signal and said analog demodulated color difference signals; and means for displaying said color signals.

\* \* \* \* \*